Jan. 3, 1939.   M. A. EDWARDS   2,142,837
DISCHARGE LAMP SYSTEM
Filed March 27, 1937

Inventor:
Martin A. Edwards,
by Harry E. Dunham
His Attorney.

Patented Jan. 3, 1939

2,142,837

UNITED STATES PATENT OFFICE 2,142,837

DISCHARGE LAMP SYSTEM

Martin A. Edwards, Schenectady, N. Y., assignor to General Electric Company, a corporation of New York Application March 27, 1937, Serial No. 133,471

6 Claims. (Cl. 176—124)

My invention relates to discharge lamp systems which operate on alternating current. It is the object of my invention to provide an improved system of this character whereby the lamp shall produce flashes of light having a frequency which is the same as the frequency of the alternating current on which the system operates.

Another object of my invention is the provision of such a system wherein the maximum brilliancy of each flash is high relative to the average value of the light thereof.

My invention will be better understood from the following description taken in connection with the accompanying drawing, and its scope will be pointed out in the appended claims.

Figure 1:
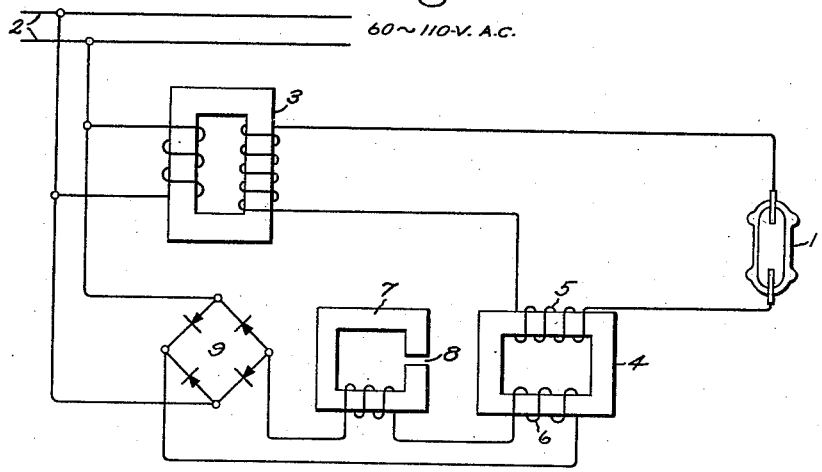
Figure 2:
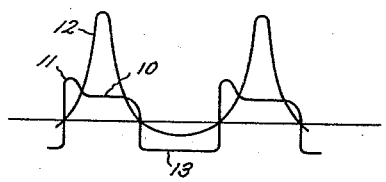
Figure 3:
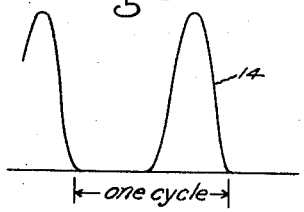

Referring to the drawing, Fig. 1 is a circuit diagram illustrating an embodiment of my invention; Fig. 2 shows the lamp voltage and current waves; and Fig. 3 shows the wave of light flux of the lamp.

In Fig. 1, I have shown the discharge lamp 1 as a gas discharge cold cathode lamp of the small high pressure mercury vapor type such as that disclosed and claimed in the copending application of Cornelis Bol et al., Serial No. 46,952, filed October 26, 1935 and assigned to the same assignee as the present application. The lamp 1 is shown connected to be operated from the 60 cycle, 110 volt lighting circuit 2. Inasmuch as the lamp requires a higher voltage than that of the circuit 2 for its operation, for example, 440 volts, I have shown it connected with the source of supply through the step-up transformer 3.

It is well known that when such a discharge lamp is connected across a source of supply of alternating current of proper voltage, there will be as many light flashes as there are alternations of the current, in other words, the frequency of the light flashes will be equal to twice the frequency of the alternating current. In accordance with my invention, now to be described, the number of flashes produced by the lamp will be one-half the number of alternations, hence it will equal the frequency of the alternating current in cycles per second. This result I obtain by modulating the wave form of the voltage supplied to the lamp by inductive means whereby each half cycle of supply voltage of one polarity causes the lamp to emit light while each half cycle of the opposite polarity does not cause the lamp to produce light but is sufficient only to maintain the ionization in the lamp produced by the previous half cycle.

I effect such modification of the wave form by inserting in the lamp circuit inductive means which introduces a second harmonic. In the drawing I have shown such inductive means as comprising the saturable reactor 4 having the main or alternating current winding 5 included in series with the lamp and the transformer 3 and having the direct current or saturating winding 6 which may be supplied by direct current from any suitable source. It is highly desirable that the core of the saturable reactor 4 shall have a relatively high permeability. Connected in series with the saturating winding 6 is the reactor 7 having the air gap 8 in its magnetic circuit. For convenience I have shown the saturating winding 6 supplied by direct current obtained from the alternating current circuit 2 through the full wave rectifier 9. However, it will be understood that any suitable source of supply of direct current may be employed for this purpose.

Referring now to Fig. 2, let it be assumed that during the positive half cycles of current in the winding 5 the direction of the current in the winding 6 be such as to increase the flux and cause saturation of the core of the reactor 4. The wave 10 of voltage applied to the lamp rises suddenly from zero to a point such as 11 at which the lamp breaks down and a discharge takes place therein. The voltage thereupon drops to a lower value and continues at a substantially uniform value through the greater portion of the positive half cycle. The resulting wave 12 of current through the lamp rises rapidly, however, to a maximum and then decreases to zero causing the lamp to emit a brilliant flash of light. Upon the following negative half cycle 13 of applied voltage the core of the reactor 4 is unsaturated and hence the reactor offers a high impedance to the flow of current in the lamp circuit with the result that the voltage applied to the lamp is insufficient to cause the lamp to break down and to emit light. However, the voltage during this negative half cycle is sufficient to maintain the ionization in the lamp produced by the previous half cycle. Hence at the moment that the voltage again becomes positive the lamp is in condition to break down as soon as the voltage reaches the proper value and the above-described process is repeated.

Inasmuch as the impedance offered by the rectifier 9 to the flow of alternating current induced in the saturating winding 6 is extremely small, the reactor 7 serves to limit both a short circuit current in the lamp circuit and the peak value of the current flow through the lamp. Since a discharge in the lamp occurs only during the half cycles of one polarity, assumed above to be the positive half cycles, there will be only as many light flashes produced by the lamp as there are half cycles of that polarity. Hence the frequency of the flashes will equal the frequency of the alternating current supplied to the lamp. This is illustrated graphically by Fig. 3 where the curve 14 represents the light flux produced by the lamp, there being one curve of flux for each cycle of applied voltage.

My invention is adapted for various uses. One use, by way of example, is in a motion picture projector wherein the discharge lamp provides the source of light for the projection. In this case the usual shutter may be dispensed with provided the number of pictures projected per second is equal to one-half the frequency of the alternating current supply. For example, if a 60 cycle alternating current is employed the shutter may be omitted if the intermittent mechanism of the projector is operated at such a speed or is so constructed that 30 pictures per second are projected. It is of course necessary to time the light flashes so that they occur only during those periods in which the film is stationary. Obviously each picture then will be projected twice, once for each flash, the two projections serving the same purpose of avoiding the sensation of flicker as does the usual flicker shutter.

Another use of my invention is that of a source of illumination for taking motion pictures. During those periods at which the camera shutter is closed there is no need of having the subject illuminated or at least illuminated to the extent necessary for the proper exposure. One may therefore economize on the production of light by employing a system such as I have disclosed herein and operating the camera shutter in synchronism with the light flashes. If a 60 cycle current is employed and the camera makes 30 exposures per second the timing of the shutter should be such that alternate flashes come during the closed periods of the shutter. I prefer, however, in this case to employ a lower frequency current, for example, a current of 24 cycles per second and to operate the camera at the usual speed to take the standard number or 24 pictures per second. All the light flashes then will be made to occur during the exposure periods of the camera and a maximum economy will be effected.

My invention is particularly well adapted for the above-mentioned uses since by reason of the peaked form of the current curve 12 the light produced by the lamp has a high maximum brilliancy, that is, high in comparison with the average value of the light during the flash.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. In combination, an electric discharge lamp, a saturable reactor having a main and a saturating winding, means for connecting said lamp and said main winding in series with a source of alternating current supply and means having inductive reactance for supplying direct current to said saturating winding.

2. In combination, an electric discharge lamp, means for supplying alternating current thereto and a reactor in circuit with said lamp having means for producing a unidirectional flux therein to cause saturation therein at alternate half cycles of the supplied current.

3. In combination, an electric discharge lamp, a source of supply of alternating current connected therewith and inductive means in circuit with the lamp for reducing the amplitude of the half cycles of one polarity with respect to those of the other polarity whereby alternate half cycles produce discharges in the lamp and the other half cycles are limited in amplitude to that required to maintain ionization in the lamp.

4. A system arranged to be energized by alternating current for producing light flashes having a frequency equal to the frequency of said alternating current comprising a source of alternating current supply, a stepup transformer having its primary connected therewith, an electric discharge lamp connected with the secondary of said transformer, a saturable core reactor having a main winding connected in series with said lamp and secondary and having a saturating winding, and means including a reactor for supplying direct current to said saturating winding.

5. In combination, an electric discharge lamp, means for supplying alternating current thereto and a saturated core reactor in circuit with said lamp for causing the frequency of the lamp flashes to equal the frequency of said current.

6. In combination, an electric discharge lamp, means for supplying alternating current thereto and inductive means in circuit with said lamp providing a higher impedance during the half cycles of one polarity than during the half cycles of the opposite polarity for limiting the flashes of said lamp to each alternate half cycle of said current.

MARTIN A. EDWARDS.